US008000488B2

(12) United States Patent
    Suyama

(10) Patent No.: US 8,000,488 B2
(45) Date of Patent: *Aug. 16, 2011

(54) METHOD OF PREPARING OF AN EAR MOLD AND THE EAR MOLD THEREOF

(75) Inventor: Keita Suyama, Chiba (JP)

(73) Assignee: Suyama Dental Laboratory, Inc., Chiba-shi (JP)

( * ) Notice: Subject to any disclaimer, the term of this patent is extended or adjusted under 35 U.S.C. 154(b) by 530 days.

This patent is subject to a terminal disclaimer.

(21) Appl. No.: 11/928,449

(22) Filed: Oct. 30, 2007

(65) Prior Publication Data

US 2008/0116003 A1    May 22, 2008

(30) Foreign Application Priority Data

Oct. 30, 2006 (JP) ................................. 2006-294236

(51) Int. Cl.
    *H04R 25/00* (2006.01)
(52) U.S. Cl. ..................... 381/328; 381/322; 381/330
(58) Field of Classification Search .............. 381/322, 381/324, 328, 330, 338, 380, 382; 181/129, 181/130, 135; 29/896.21; 128/864; 264/222
    See application file for complete search history.

(56) References Cited

U.S. PATENT DOCUMENTS

| | | | | |
|---|---|---|---|---|
| 2,763,334 A * | 9/1956 | Starkey | .......................... | 181/135 |
| 5,146,051 A | 9/1992 | Hermann | | |
| 7,372,972 B2 * | 5/2008 | Ach-Kowalewski et al. | . | 381/328 |
| 7,424,122 B2 * | 9/2008 | Ryan | .............................. | 381/322 |
| 2004/0252854 A1 | 12/2004 | Juneau et al. | | |
| 2009/0141920 A1 * | 6/2009 | Suyama | ........................ | 381/328 |

FOREIGN PATENT DOCUMENTS

| | | |
|---|---|---|
| EP | 1448015 A1 | 8/2004 |
| JP | 08-195999 A | 7/1996 |
| WO | 2006-082735 A2 | 8/2006 |

OTHER PUBLICATIONS

Written Answer in International Searching Authority.

* cited by examiner

*Primary Examiner* — Huyen D Le
(74) *Attorney, Agent, or Firm* — Westerman, Hattori, Daniels & Adrian, LLP

(57) ABSTRACT

In regard to an ear mold for a hearing aid, there are provided the ear mold which a metal bush is settled in a tube for joint of the hearing aid, the metal bush has been used on account of settlement of said tube for joint of the hearing aid, and which a tube is adhered by an adhesive, the adhesive has been used on account of settlement of said tube. However, said ear mold has disadvantages that said tube is easily moved for the reason of instability, said tube drops out from the ear mold, and the ear mold has the problem of a phenomenon of a howling by sound leak-out.
An ear mold E based on custom-made impression 1 and joined the ear hook hearing aid, also, in said ear mold E, a hub 12 having an elbow-loading-hole 121, a sound-leading tube loading hole 122 and an introductory-hole of a ear mold forming material 123 were embedded into an ear mold 17, a sound-leading tube 14 was loaded the sound-leading tube loading hole 122 of the hub 12, an elbow 13 was joined (loaded) with said elbow-loading hole 121 of the hub 12, the elbow 13 was loaded a tone tube 21, the hub 12 was fixed the body portion of the ear mold forming material 17 through the introductory-hole of the ear mold forming material 123, and a method of preparing of thereof.

2 Claims, 18 Drawing Sheets

METHOD OF PREPARING OF AN EAR MOLD AND THE EAR MOLD THEREOF

TECHNICAL FIELD

The present invention relates to the method of preparing of the ear mold and to the ear mold thereof.

BACKGROUND ART

A hearing aid may be used by one who is hard of hearing and so on. Particularly, in the interest of one who is hard of hearing, the hearing aid uses on account of a supplement of the power of hearing by spreading of the power of sound from external world.

The hearing aid comprising a microphone which may be received sound from external world, a speaker which the sound may be transmitted into an ear, a body portion having an electric device (include an electric battery) which may be drove the microphone and the speaker, and the ear mold which may be inserted into a ear (the external auditory meatus) and may be joined said body portion. Said hearing aid can be amplified the sound from the outside, and this amplified sound transmits to the eardrum through said ear mold.

Said hearing aid is generally two types (kinds).

One type of the hearing aid is an ear hole type hearing aid. This ear hole type hearing aid use that an ear plug with an internal a body portion of the hearing aid inserts directly into a ear (the external auditory meatus).

The other type of the hearing aid is an ear hook type hearing aid. This ear hook type hearing aid comprises that the pipe etc. connects with the body portion of said hearing aid. This ear hook type hearing aid use that this pipe etc. hangs and supports behind an ear pinna. This ear hook type hearing aid use that the ear mold linked this pipe etc. inserts into the external auditory meatus.

Whatever an efficiency of the body portion of the hearing aid may be raised, when the ear mold cannot be adapted to a user, it gives an unpleasant feeling against the user in a long-time use, and it cannot maintain a tone's proper quality. In the ear mold for the hearing aid, the problem of occurring of a sound pee-pee and sound leak-out (what is called a phenomenon of a howling) is important thing.

However, it is difficult to adapt for user an ear plug, because external auditory meatus of the user of the ear plug is bendy and has vary between individuals.

In regard to the ear mold for the hearing aid, lately, the ear mold of a custom-made which is produced according to the order of a shape of the ear of an each user has been recommended as above-mentioned ear mold. However, said ear mold of custom-made too causes some problems that give an incompatibility feeling against the user, easily gets out of the user's ear, and occurs the phenomenon of the howling.

The forming material of the ear mold has been used a MMA (methylmethacrylate) resin, for example, but lately a silicon resin has been used as the forming material of the ear mold. Because, the silicon resin can be reduced a burden at the time of touch with the external auditory meatus, the silicon resin has not an allergy reaction and the like, consequently, the silicon resin can be adapted for the above-mentioned use.

For manufacture of the ear mold of the custom-made, generally, a forming material of an impression such as the silicon system material inserts into the external auditory meatus of the user, after hardening, the ear impression can be obtained by means of molding (forming). After spread wax and the like in a surface of said ear impression, a plaster pours into a pattern of said ear impression, and then said ear impression takes up from said pattern. After removing of said wax and a paraffin wax from said ear impression, and then a pattern of plaster make forming based on this ear impression. The forming material of the ear mold such as the silicon resin pours into said pattern of plaster, after hardening (molding) of said forming material of the ear mold, and then the ear mold of the custom-made can be obtained.

(Japan Unexamined Patent Publication No. 2000-139999).

Heretofore, as said silicon ear mold, it was proposed that said silicon ear mold shown in FIG. 18 which is prepared by the above-mentioned method and based on the ear impression picked from the user. This silicon ear mold can be made by as follows.

A tube 1802 passes into a lead-sound-hole of the silicon ear mold 1801, this tube 1802 passes through said ear mold 1801 as shown in FIG. 18, the metal bush 1803 as shown in FIG. 18 fits into an end section of this tube 1802, this tube 1802 pulls back for reasons of this metal bush 1803 puts in an end section of this silicon ear mold 1801. In this case, said metal bush 1803 has been used on account of settlement of the above-mentioned tube 1802.

However, said silicon ear mold has disadvantage that said tube 1802 is easily moved for the reason of instability, because said tube 1802 is settled by said metal bush 1803.

Also, said silicon ear mold has disadvantage that the tube 802 is destroyed by stress concentrated on the above-mentioned put-spot of ear mold 1801 when takes away by oneself, and the tube 1802 drops out from the ear mold 1801.

On the other hand, there are provided the silicon ear mold 1701 as shown in FIG. 17 which manufactured by previously-mentioned method. In this silicon ear mold 1701, a plastics-elbow or nylon-L-tube 1702 insert into the lead-sound-hole of silicon ear mold 1701 as shown in FIG. 17. Said plastics-elbow or nylon-L-tube 1702 is connected with said silicon ear mold 1701 by an adhesive. Namely, said plastics-elbow or nylon-L-tube 1702 is fixed by the glued-part 1703 of said plastics-elbow or nylon-L-tube 1702 in the inside of said silicon ear mold 1701. In said silicon ear mold 1701, as shown in the drawings, the one end portion of plastics-elbow or nylon-L-tube 1702 is connected by an adhesive in form of putting away the inside of said silicon ear mold 1701.

As shown in the drawings, the other end portion of the tube for joint of the hearing aid (vinyl tube) 1704 may be joined with said plastics-elbow or nylon-L-tube 1702.

In said silicon ear mold, the plastics-elbow or nylon-L-tube 1702 doesn't put away still the inside of said silicon ear mold 1701. Said plastics-elbow or nylon-L-tube 1702 cuts off under suitable length.

Therefore, said plastics-elbow or nylon-L-tube 1702 can be corresponded flexibility still in case of small of the external auditory meatus. Said plastics-elbow or nylon-L-tube 1702 is different from said silicon ear mold 1801 as previously mentioned as shown in FIG. 18.

For reason of stiffen of said vinyl tube 1704 became increase with use, it is necessary to change periodically, but said vinyl tube 1704 is not one-body and is independent from said ear mold 1701 through the intervention of said plastics-elbow or nylon-L-tube 1702, therefore the working of exchange become easy.

But, said silicon ear mold has problems that intensity of adhesive become lack, said plastics-elbow or nylon-L-tube 1702 detaches easily or drops out from said ear mold 1701, and occurs the phenomenon of the howling by a sound pee-pee and sound leak-out.

On the other hand, the present inventor was provided newly the silicon ear mold used a hub as shown Figure from 14 to 16 which can be dissolved the problems issued at those prior art technologies (International Publication Number WO/2006/082735).

In the silicon ear mold, as shown FIGS. 14 and 15, a hub 1402 such as shown FIG. 16 is embedded in an ear mold 1401, this hub 1402 has the function of relaying, this hub 1402 can be transmitted the sound from the era hook hearing aid to the eardrum.

A body portion 1402A of the hub 1402 has two introductory holes 1402A1 and 1402A2 of the forming material of the ear mold, the hub 1402 may be contacted and fixed with the forming material of the ear mold 1401 through said two introductory holes 1402A1 and 1402A2.

An elbow 1403 joins with the joint-hole 1402B0 of a joint portion 1402B of the hub 1402, this elbow 1403 joins with a tube for joint of the hearing aid 1404.

The silicon ear mold has a sound-guiding hole 1405 formed by molding material of the silicon ear mold.

In said silicon ear mold, the sound of the era hook hearing aid can be transmitted to the eardrum by relaying of said hub 1402 after through a sound-guiding hole 1405 formed by hole-opening.

According to the silicon ear mold, it can be supported a relation ship of a position between the hearing aid and the ear mold and can be increased the improvement of stability of using when the ear mold puts into the hearing aid, because the hub 1402 was embedded in the ear mold and the hub 1402 was connected and fixed with the forming material of the ear mold at the introductory-hole for the forming material of the ear mold (the hole in order to fix with mold) 1402A1 and 1402A2.

However, when, the side of the external auditory meatus joins with a sound-leading tube as substitute for the above-mentioned sound-guiding hole 1405 formed by molding material of the silicon ear mold, it has the problems that said sound-leading tube become flabby accordingly climb-down and become bend easily at a right angle, it can't act as a kind of said sound-leading tube by reason of impassableness of the sound, and the bend of thereof make by specially proper angle fitted for the people become restores, when heating.

Furthermore, in case of joint which the sound-leading tube with the hub, it is necessary that said sound-leading tube joints with accordingly under adjustment of desired-angle of bend, because the external auditory meatus of the user is bendy-bendy and has vary personal difference, nevertheless it has the problems that the sound-leading tube can not put forward till deeply in the mold, in the case of contact with the inner-wall surface of the mold, search for ways to circumvent, it can not be clinched as avoid with the inner-wall surface of the mold.

[Patent Document 1] Japan Unexamined Patent Publication No. 2000-139999

DISCLOSURE OF INVENTION

Technical Problem

It is therefore an object of the present invention to provide technical skill to eliminate the above-mentioned problems, and to provide technical skill related new method of the ear mold used the above-mentioned hub.

The foregoing and other objects and novel features of the present invention will become clear from the following description and the accompanying drawings.

Technical Solution

Advantageous Effects

According to the resent invention, there has the following advantages.

Heretofore, when the sound-leading tube was joined in the side of the external auditory meatus of the hub, it has the problems that said sound-leading tube become flabby accordingly climb down and become bend easily at a right angle, it can't act as a kind of said sound-leading tube by reason of impassableness of the sound, and it has the problems that the bend angle thereof make by specially proper angle fitted for the people become restore, when heating.

Furthermore, in case of joint which the sound-leading tube with the hub, it is necessary that said sound-leading tube joints with accordingly under adjustment of desired-angle of bend, because the external auditory meatus of the user is bendy-bendy and has vary personal difference, nevertheless it has the problems that the sound-leading tube can not put forward till deeply in the mold, in the case of contact with the inner-wall surface of the mold, search for ways to circumvent, it can not be clinched as avoid with the inner-wall surface of the mold.

However, according to the present invention, it's problem can be dissolved, by used said sound-leading tube guide wire.

Specially above-mentioned guide wire has a core wire and a coated layer, according to carry out a function of flexibility, it can be clinched as avoid contact with the wall surface of the plaster-pattern and the sound-leading tube etc., the sound-leading tube can be jointed with the hub under desired angle.

According to the present invention, it's problem can be dissolved by used a wire for forming of a vent specially the vent having a core wire and a coated layer, according to carry out a function of flexibility, it can be clinched as avoid contact with the wall surface of the plaster-pattern and the sound-leading tube etc., the vent (the air hole) can be jointed with the hub under desired angle.

According to the present invention, by using of the tool for embedding of the hub, the hub can be embedded into suitable position of the mold body portion, and said sound-leading tube can be joined with the hub under keeping of position of thereof, when said sound-leading tube may be joined with the hub, as above-mentioned According to the present invention, the hub can be properly acts as the joint, and the acoustic wave generated from the hearing aid can be communicated from direction of the elbow to direction of the sound-leading tube. The hub can be fixed with the mold material, because the hub was embedded in the mold body portion of the ear mold.

In addition, the hub can be more solidly joined, because the hub has the introductory hole of the molding material and the hub can be fixed with the mold material through said introductory hole of the molding material.

Accordingly, a relation ship of a position between the hearing aid and the ear mold can be properly supported, and the improvement of stability of use puts into the hearing aid when the using of the ear mold can be increased, because the hub and the sound-leading tube was embedded in the mold body portion of the ear mold.

Accordingly, the sound-leading tube does not drop out from said ear mold and can be proofed for a prolonged period against external force caused by removal of the ear mold.

According to the sound-leading tube, there has not the problem of occurring of the sound leak-out and it can be restrained the phenomenon of the howling.

BEST MODE FOR CARRYING OUT THE INVENTION

The examples of the present invention will be described according to the drawings.

(a) "The step of forming of the hole to the impression"

To the impression obtained by preparing of the lug plug according to prescribed method, as shown FIG. 2A, the trimming of the outer shape runs after decision of final embodiment based on the capacity of hearing of the applicable man, the model of the hearing aid used, the content of adjustment thereof etc.

To the above-mentioned impression trimmed the outer shape, as shown FIG. 2B, a wire guide hole in order to give a hole for supporting of a sound-leading tube guide wire (a sound-leading tube wire guide hole) 2, a wire guide hole in order to give a hole for supporting of a wire for forming of a vent (a vent wire guide hole) 3, a hole in order to support the tool for embedding of the hub 4 are formed (gave).

Said vent wire guide hole 3 may be composed a vent wire guide hole 3a formed in the end portion of external auditory meatus 1a and a vent wire guide hole 3b formed in side of an opening portion of an ear hole 1b as shown Figure. Meanwhile, it will be described according to include the forming of a vent in the following explanation too.

In said side of an opening portion of an ear hole of the impression 1, a hole in order to support the tool for embedding of the hub 4 forms.

Meanwhile, in FIG. 2A and FIG. 2B, right-and-left Figures thereof are shown same impression, in this regard, Figure of left side of FIG. 2A shows the Figure viewed from the direction of right side arrow of FIG. 2A. In addition, Figure of right side of FIG. 2B shows the Figure viewed from the direction of left side arrow of FIG. 2B.

(b) "The step of inserting of the wire in order to give a hole for supporting of a sound-leading tube guide wire, the wire in order to give a hole for supporting of a wire for forming of a vent and the tool for embedding of the hub into above-mentioned"

As shown FIG. 3A, the wire in order to give a hole for supporting of a sound-leading tube guide wire 5 was inserted into above-mentioned sound-leading tube wire guide hole 2, the wire in order to give a hole for supporting of a wire for forming of a vent 6a, 6b was inserted into each the vent wire guide hole 3a and the vent wire guide hole 3b formed in the end portion of external auditory meatus, the tool for embedding of the hub 7 was inserted into the hole in order to support the tool for embedding of the hub 4.

Said tool for embedding of the hub 7 has a plaster-insert portion 70, a hub-stopper 71 and the hub-insert-portion 72 as shown FIG. 3 B.

Said wire in order to give a hole for supporting of a sound-leading tube guide wire 5 and the wire in order to give a hole for supporting of a wire for forming of a vent 6a, 6b has a core wire 50 and a coated layer 51 as shown FIG. 3C. Said core wire 50 can be composed a copper wire, for example, and said coated layer 51 can be composed a plastics-coated layer such as a polyvinylchloride, for example.

(c) "The step of forming of a preliminary form (plaster preliminary inserting) based said impression inserted the wire and the hub"

As shown FIGS. 4A and 4B, the forming material was injected and formed in the under-side of a vessel. In first, the forming material was injected into about half of the under-side of a vessel 8b, after that, said impression 1 which was inserted the wire in order to give a hole for supporting of a sound-leading tube guide wire 5, the wire in order to give a hole for supporting of a wire for forming of a vent 6a, 6b and the tool for embedding of the hub 7 was inserted under proceeding check something about direction of each portion.

After that, the forming material was injected and added such as about half of said impression may be embedded. The forming material was injected and formed such as the wire in order to give a hole for supporting of a sound-leading tube guide wire 5, the wire in order to give a hole for supporting of a wire for forming of a vent 6a, 6b and the tool for embedding of the hub 7 may be gone into under position of the forming material.

The under-side of a vessel 8b can be composed a flask-like-under-tray, for example.

The forming material can be recited plaster representatively, but somewhere else for example such as latex rubber can be used.

The plastic etc. can be added in the plaster according to need.

(d) "The step of laying of the upper-side of the vessel in the under-side of a vessel, supplying of a forming material, and pressure hardening"

A separating agent was coated in a face of the plaster of plaster-pattern 11b of the flask-like-under-tray 8b, after drying, the upper-side of the vessel (for example; the flask-like-upper-tray) 8a was laid on the flask-like-under-tray 8b as shown FIG. 5A, the plaster was injected.

After this injection of the plaster, as shown FIG. 5B, a pressure-board was laid on the flask-like-upper-tray 8a, the plaster was hardened. Each plaster of the flask-like-upper-tray 8a and the flask-like-under-tray 8b are hardened.

(e) "The step of opening of between the under-side of a vessel and the upper-side of the vessel, forming of an upper half prototype form in the upper-side of the vessel by said forming material"

After hardening of the plaster injected into the flask-like-upper-tray 8a, the flask-like-upper-tray 8a and the flask-like-under-tray 8b, they are divided and opened. In the side of the flask-like-upper-tray 8a, as shown FIG. 6A, a flask-like-upper-tray-plaster-pattern 11a which may be composed of the plaster-pattern of an upper-half-shape 11a-1 of the impression 1 was formed.

The pressure-board 8c was firmly fixed in flask-like-upper-tray 8a by the injected and hardened plaster. The separating agent of the silicon material was coated in a face of the plaster, from necessity of after-step.

(f) "The step of getting off said impression and said wire in order to give a hole for supporting of a sound-leading tube guide wire, and getting at a prototype form of the under-side of a vessel of the impression having a hole for supporting of a sound-leading tube guide wire and buried said tool for embedding of the hub as enable to stick out a hub-insert-portion"

When the impression 1, the wire in order to give a hole for supporting of a sound-leading tube guide wire 5, and the wire in order to give a hole for supporting of a wire for forming of a vent 6a, 6b are got off from the flask-like-under-tray 8b, as shown FIG. 6B, a flask-like-under-tray-plaster-pattern 11b of the plaster-pattern of an under-half-shape 11b-1 of the impression 1 which the tool for embedding of the hub 7 was inserted as enable to stick out the hub-insert-portion 72 and having a hole for supporting of a sound-leading tube guide wire 9 and a hole for supporting of a wire for forming of a vent 10a, 10b was formed.

The separating agent of the silicon material was coated in a face of the plaster, from necessity of after-step.

(g) "The step of inserting of a guide wire into a sound-leading tube trough said hole for supporting of a sound-leading tube guide wire of said prototype form of the under-side of a vessel, loading of a sound-leading tube into a sound-leading-tube-loading-hole of a hub having the sound-leading-tube-loading-hole an elbow-loading-hole and an introductory hole of the mold material, and loading of a side of an elbow-loading-hole of the hub into said hub-insert-portion of said tool for embedding of the hub stack out from the prototype form of the under-side of a vessel"

The used hub 12 here will be described.

Said hub 12 may be composed having a elbow-loading hole 121, a sound-leading tube loading hole 122 and an introductory-hole of the ear mold forming material 123 as shown FIG. 7A~7D and 8A~8B.

As shown FIG. 8A~8B, the elbow 13 was joined (loaded) with said elbow-loading hole 121 of the hub 12.

Said sound-leading tube 14 was loaded the hole 122 of the hub 12.

Said hub 12 can be composed by plastics for example. Said hub 12 can be joined (loaded) with said elbow 13 and said sound-leading tube 14 by an adhesive.

Said hub 12 can be composed by the material having the adhesiveness.

As shown FIG. 8A~8B, said hub 12 can be firmly fixed with the mold body portion 17 formed by using the mold materials 17a, 17b which supplies (mold) to the flask-like-upper-tray-plaster-pattern 11a and the flask-like-under-tray-plaster-pattern 11b. But according to the introductory-hole of the ear mold forming material 123 may be designated in the hub 12 as shown FIGS. 7 and 8 and when that fixation may be carried out through said ear mold forming material 123, it can be more firmly fixed and joined.

Said hub 12 can be carried out a function as joint which a sound wave gave out from the hearing aid can be transmitted from the elbow 13 to the sound-leading tube 14.

As shown FIGS. 9, 10A and 10B, a guide wire (of the sound-leading tube) 15 was inserted into the hole for supporting of a sound-leading tube guide wire 9 of the flask-like-under-tray-plaster-pattern 11b, the sound-leading tube 14 was loaded the sound-leading tube loading hole 122.

The sound-leading tube 14 can be preferably cut off suitable length suited for the lug plug.

As above mentioned, according to the sound-guiding hole formed by molding material of the silicon ear mold, it has the problem of occurring of the sound leak-out and occurring of the phenomenon of the howling. Contrarily, according to the sound-leading tube 14 of the present invention, there has not the problems of occurring of the sound leak-out and it can be restrained the phenomenon of the howling.

As shown FIG. 10B, it is desirable that the guide wire (of the sound-leading tube) 15 is deeply inserted into till the inner of the sound-leading tube 14.

As shown FIGS. 9 and 10, the side of the elbow-loading hole 121 of the hub 12 was loaded into said hub-insert-portion 72 of said tool for embedding of the hub 7 stack out from the plaster-pattern. The rotational direction of hub 12 setups as avoid contact of between the hub 12 and a wall surface of the plaster-pattern, and the guide wire 15 make form as the sound-leading tube 14 does not put in position of the center of the external auditory meatus of the plaster-pattern.

A wire for forming of a vent 16 was inserted into the wire for forming of a vent 10a, 10b which cuts off suitable length suited for the lug plug of the flask-like-under-tray-plaster-pattern 11b.

A wire for forming of a vent 16 is same radius as the wire in order to give a hole for supporting of a wire for forming of a vent 6a, 6b, it may be used make adjustments to length in accordance with the shape of the impression 1. At the forming such as clinch etc. of the wire for forming of a vent 16 may be performed as avoid contact with the wall surface of the plaster-pattern and the sound-leading tube 14. Above-mentioned guide wire 15 and the wire in order to give a hole for supporting of a wire for forming of a vent 6a, 6b (the wire for forming of a vent 16) have a core wire 50 and a coated layer 51 as above shown FIG. 3C, according to carry out a function of flexibility, it can be clinched as avoid contact with the wall surface of the plaster-pattern and the sound-leading tube 14 etc., the sound-leading tube 14 can be jointed with the hub 12 under desired angle.

As shown Figure, in the side of the external auditory meatus of the hub 12, when the sound-leading tube 14 was joined, it has the problems that said sound-leading tube 14 become flabby accordingly climb down and bend easily at a right angle, it can't act as a kind of said sound-leading tube by reason of impassableness of the sound, and it restores the bend of thereof which make by specially proper angle fitted for the people when heating.

Furthermore, in case of joint which the sound-leading tube 14 with the hub, it has the problems that can not put forward till deeply in the mold.

However, according to the present invention, it's problem can be dissolved by used said sound-leading tube guide wire 15 and said wire for forming of the vent 16.

(h) "The step of molding of the mold material into a cavity of the under-side shape of the impression in the said prototype form of the under-side of a vessel, molding of the mold material into a cavity of the upper-side shape of the impression of the upper-side of a vessel, laying of the upper-side of the vessel in the under-side of a vessel, pressure-hardening of the mold material, after said hardening, opening of between the underside of a vessel and the upper-side of the vessel, and forming of a mold body portion make by said mold material"

As shown FIG. 11A, the silicon material for forming of a body portion 17 was molded into the upper-half-shape 11a-1 of the impression 1 in the flask-like-upper-tray-plaster-pattern 11a. Their molding amount is preferably about over separate interface of the flask-like-upper-tray 8a and the flask-like-under-tray 8b.

As shown FIG. 11B, the silicon material for forming of the body portion 17 was molded into the under-half-shape 11b-1 of the impression 1 in the flask-like-under-tray-plaster-pattern 11b. On this occasion, the silicon material was solidly molded into the introductory-hole of the ear mold forming material 123 of the hub 12, and the hub 12, the sound-leading tube 14, the sound-leading tube guide wire 15 and the wire for forming of a vent 16 do not change positional relation in between wall surface of the plaster form, it is necessary careful not to occur air bubble and air gap. The molding amount is preferably about over division interface of the flask-like-upper-tray and the flask-like-under-tray.

After that, as shown FIG. 12A, after the mold material was molded into the flask-like-upper-tray-plaster-pattern 11a and the flask-like-under-tray-plaster-pattern 11b, the flask-like-upper-tray 8a fixed the pressure board and the flask-like-under-tray 8b were rapidly fitted, pressed by a pressing machine 22 with the pressure board up, carried out hardening holding condition of pressure.

After hardening of the silicon material, a flask was detached from the pressing machine 22, the flask-like-upper-tray 8a, and the flask-like-under-tray 8b were divided and opened.

As shown FIG. 12B, the flask-like-under-tray-plaster-pattern 11b remained the mold body portion 17 was divided and crushed, the mold body portion 17 was got out of thereof.

(i) "The step of pulling of leftover guide wire from said mold body portion, forming a sound-leading-hole by this pulling of guide wire, embedding of the hub and the sound-leading tube, loading of a elbow into the elbow-loading-hole of said hub, loading of a tone tube in order to connect an ear hook hearing aid into said elbow"

The mold body portion 17 was broke out from the flask-like-under-tray-plaster-pattern 11b, after that, the sound-leading tube guide wire 15 and the wire for forming of a vent 16 leftover in the mold body portion 17 was pulled of from the mold body portion 17. Herewith, a sound-leading-hole and a vent (air hole) 19 was obtained in the body portion 17, as shown FIG. 12B. Also, the tool for embedding of the hub 7 was pulled of from the mold body portion 17.

The hub 12 was remained, and embedded into the mold body portion 17.

The elbow-loading-hole 121 of the embedded-hub 12 become available in ear-open portion of the mold body portion 17, as shown FIG. 13A.

A mold line 20 founded in division interface was treated with rotating-grind stone for cutting, for example, as become smooth surfaces.

The tool for embedding of the hub 7 can be detached, when the flask-like-under-tray-plaster-pattern 11b was got off from the flask-like-under-tray 8b and was fragmentized, the mold body portion 17 was got out from the flask-like-under-tray-plaster-pattern 11b The surface-finish of the body portion 17 was performed, as shown FIG. 13A-13D, after, the elbow 13 was loaded with the elbow-loading hole 121 by an adhesive.

The tone tube 21 connected the ear hook hearing top portion of the elbow 13 aid was loaded, then the ear mold as shown FIG. 13D can be obtained.

As shown enlarged ear mold in FIG. 1 and FIG. 13D, said ear mold E is the ear mold based on custom-made impression 1 and joined the ear hook hearing aid. Also, in said ear mold E, the hub 12 having the elbow-loading-hole 121, the sound-leading tube loading hole 122 and the introductory-hole of the ear mold forming material 123 were embedded into the ear mold 17, the sound-leading tube 14 was loaded the sound-leading tube loading hole 122 of the hub 12, the elbow 13 was joined (loaded) with said elbow-loading hole 121 of the hub 12, the elbow 13 was loaded the tone tube 21, the hub 12 was fixed the body portion of the ear mold forming material 17 through the introductory-hole of the ear mold forming material 123.

The elbow-loading hole 121 joined (loaded) with the elbow 13. The elbow-loading hole 121 is partial portion of the hub 12. An exit portion of the elbow-loading hole 121 of the hub 12 is located in position along the lines of outline of the mold body portion of the ear mold forming material 17 of the ear mold E.

The sound-leading tube 14 was jointed with the hub 12, an exit portion of opposite side thereof don't arrive perfectly till the lines of outline of the mold body portion of the ear mold forming material 17, it was stopped short of position.

Conclusively, the exit portion of the lines of outline of the mold body portion of the ear mold forming material 17 is the sound-leading-hole 18.

Said ear mold has preferably the vent 19.

The vent 19 is beneficial in some instances in answer to the capacity of hearing of the applicable man.

The inside diameter and length etc. of the vent 19 can be selected in answer to the capacity of hearing of the applicable man etc.

In the ear mold manufactured by the method of preparing of the present invention, the hub 12 can properly acts as the joint. Namely, in accordance with the hub, the acoustic wave generated from the hearing aid can be communicated from the direction of the elbow 13 to the direction of the sound-leading tube.

The hub 12 was embedded in the mold body portion 17. Therefore, the hub 12 can be solidly fixed the mold body portion 17.

In addition, the hub 12 can be more solidly joined, because the hub 12 has the introductory portion of the molding material 123 and the hub 12 can be fixed with the mold material through the introductory portion of the molding material 123.

Accordingly, a relation ship of a position between the hearing aid and the ear mold can be supported and the improvement of stability of use puts into the hearing aid when the using of the ear mold can be increased, because the hub 12 and the sound-leading tube 14 was embedded in the mold body portion 17 of the ear mold.

Accordingly, the sound-leading tube 14 does not drop out from said ear mold and may be proof against external force caused by removal of the ear mold can be even long-time use.

According to the sound-leading tube 14, there has not the problems of occurring of the sound leak-out and it can be restrained the phenomenon of the howling.

For example, the elbow 13 can be consist of plastics. The elbow 13 can be exchanged for L-letter-shape-tube by made plastics such as nylon etc. Said elbow 13 cuts off at the desirable length, and joins with the hub 12 fixed in the end portion of the ear mold E.

Said elbow 13 can be joined with the ear mold E by proper set-angle. In the ear mold, if said set-angle (direction) of said elbow 13 is not proper, said ear mold, said elbow 13 and said tone tube 21 become float from the ear. Therefore, the opening occurs between said elbow 13, said tone tube 21 and the ear mold E. Furthermore, the hand and finger etc become hang on said opening, and said elbow 13, said tone tube 21 and the ear mold E become easily take off from the ear.

According to the present invention, the position-relationship of the hub 12 can be controlled when making time of mold, and the direction (angle) of said elbow 13 can be appropriated. Said elbow 13 can be inconspicuous attachment to the ear and can be covered by hair.

The forming materials of the ear mold in the present invention can be used preferably the silicon material.

The silicon resin can be recited as an example of said silicon material.

The tone tube 21 can be formed by the tube of polyvinylchloride. Said tone tube 21 is necessary to regularly exchange, because said tone tube 21 become stiffen along with using. Said tone tube 21 can be exchanged easily, because said tone tube 21 joins with the elbow 13 is independent from the ear mold E.

The present invention is not limited to the above-mentioned specific embodiments and various change and modifications may be made, for example, embodiment that the ear mold joins with the body portion of the hearing aid by two tubes has shown in above-mentioned, but more than three tubes may be applied.

In accordance with the hub 12 has the part of a curve in the part of the body portion thereof. Therefore, said hub 12 may be contacted with the ear mold all the more, and the fixing of between said hub 12 and the ear mold may be more fixed.

Furthermore, in accordance with the numbers of the introductory-hole for the forming material of the ear mold 123 in the body portion of the hub 12 was increased, for example, said total this numbers may be composed with four numbers having two this numbers in each both side of end portion of the hub 12.

Therefore, said hub 12 can be contacted with the forming material of the ear mold all the more, and the fixing of between said hub 12 and the ear mold can be more fixed all the more. Said hub 12 in the ear mold can stable because of reducing of revolution.

In the method of preparing of the present invention, can be changed it's procedure.

INDUSTRIAL APPLICABILITY

The present invention may be applicable to mold by the other forming material except for the silicon forming material.

BRIEF DESCRIPTION OF THE DRAWINGS

[FIG. 16] It is schematic view showing examples of conventional ear mold.

EXPLANATION OF REFERENCE

Figure 1:
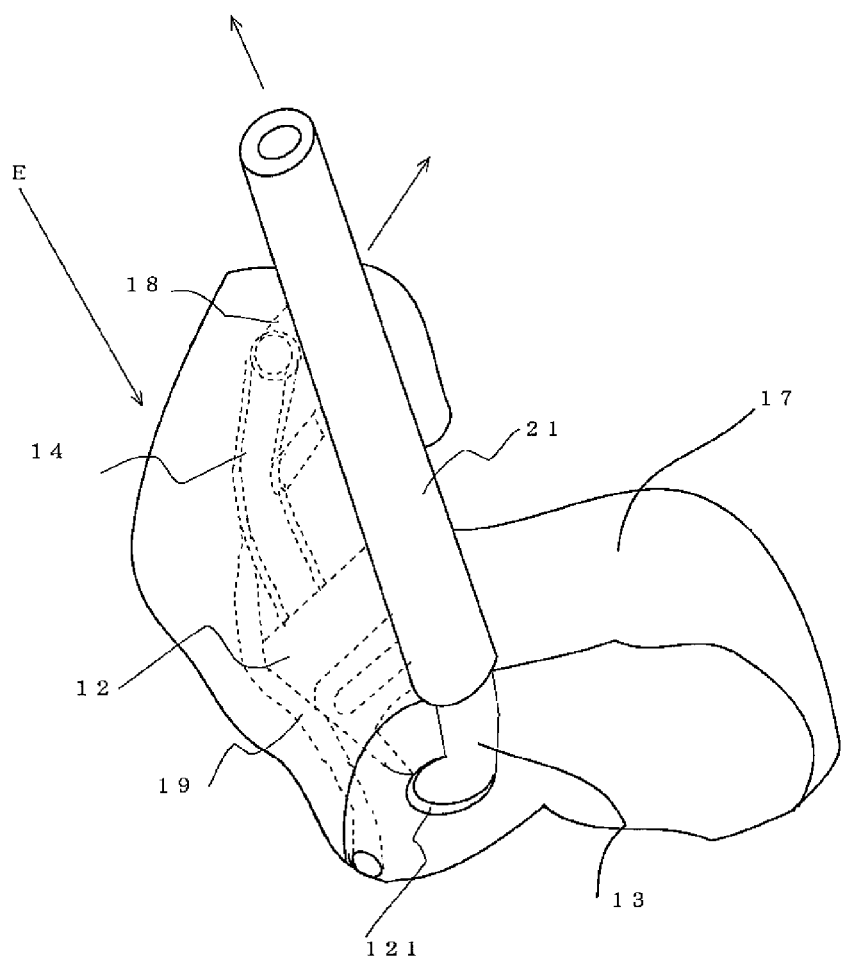
[FIG. 1] It is an example of expanded schematic view of the ear mold embodying the present invention.
Figure 2:
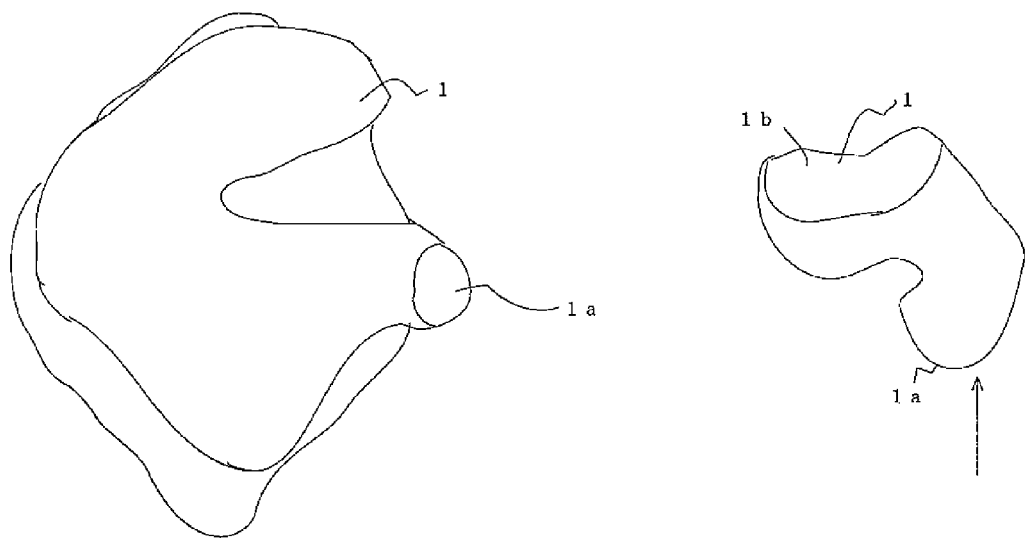
[FIG. 2] 2A-2B Each Figures is an explanatory Figures of the method of preparing of the ear mold in Examples of the present invention.
Figure 2:
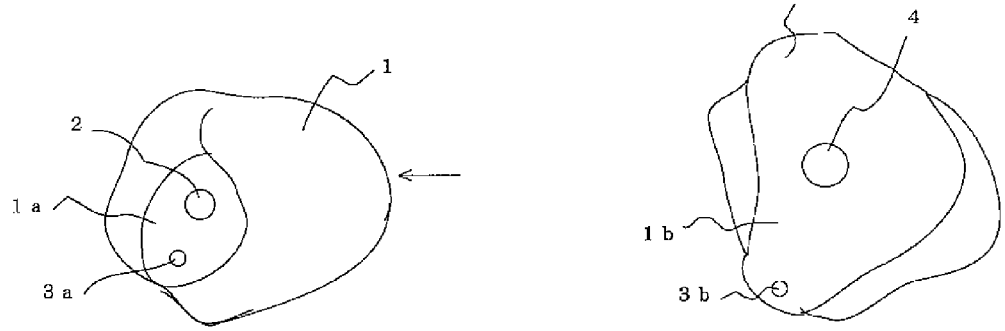
Figure 3:
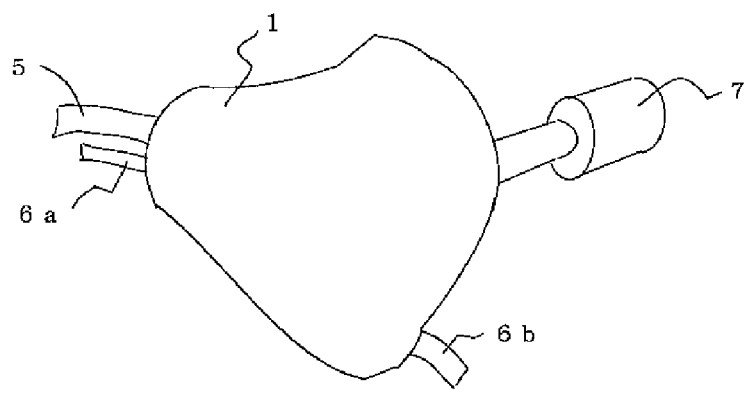
[FIG. 3] 3A-3C Each Figures is an explanatory Figures of the method of preparing of the ear mold in Examples of the present invention.
Figure 3:
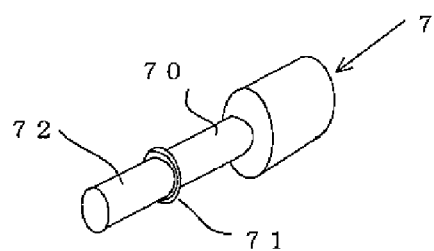
Figure 3:
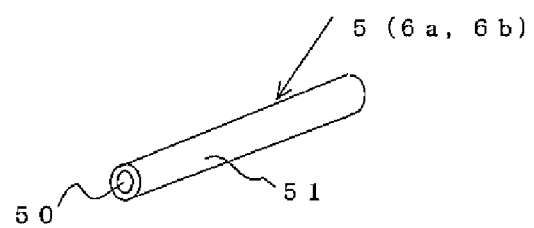
Figure 4:
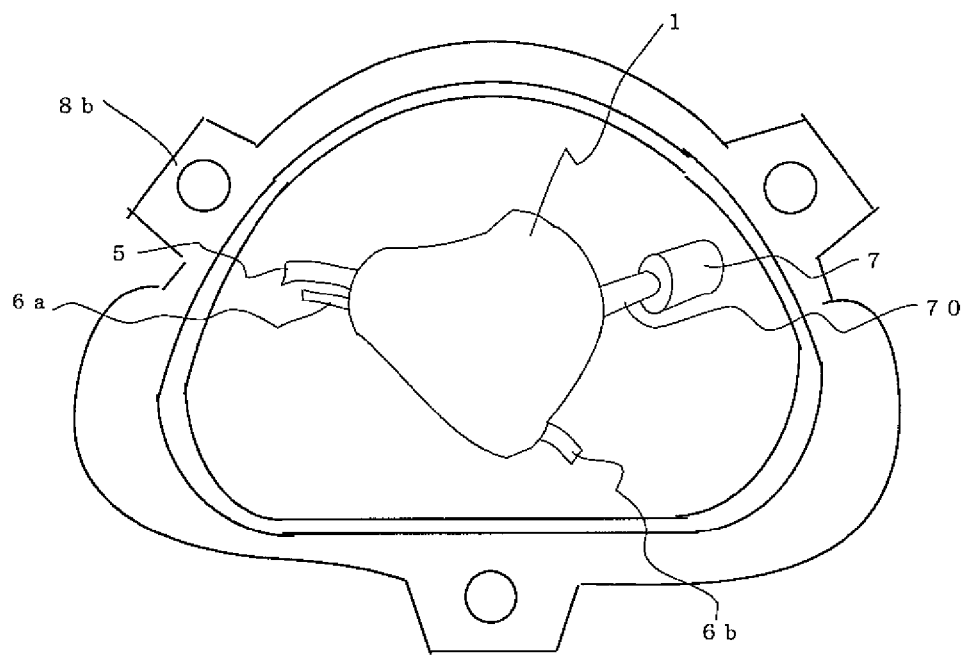
[FIG. 4] 4A-4B Each Figures is an explanatory Figures of the method of preparing of the ear mold in Examples of the present invention.
Figure 4:
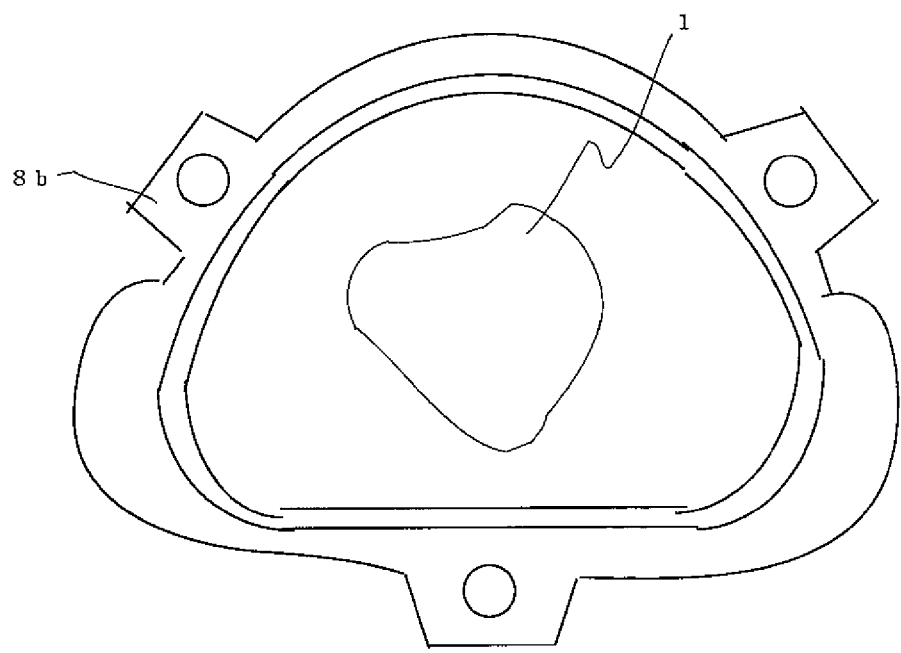
Figure 5A:
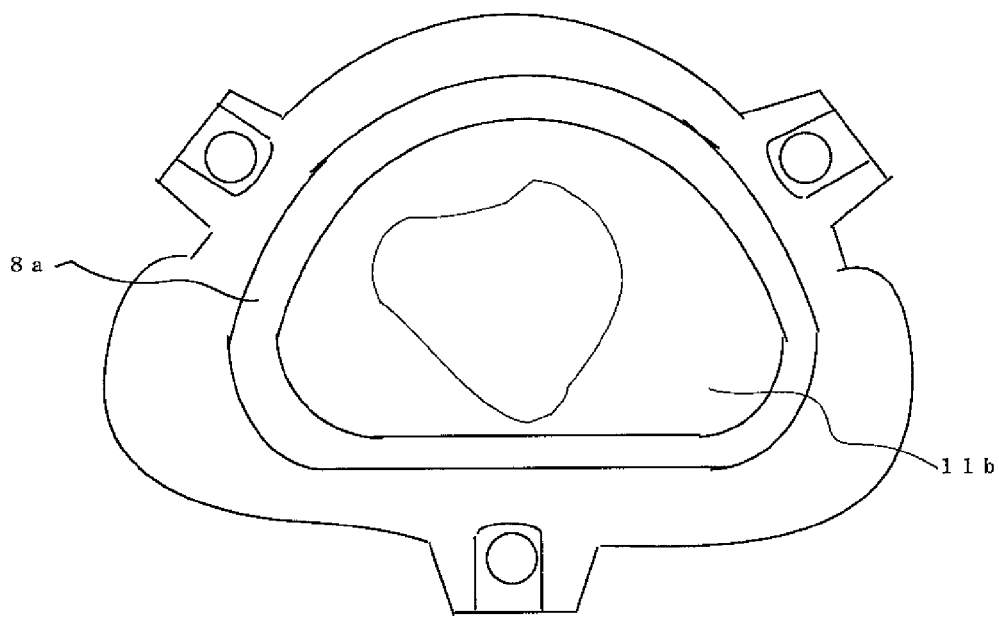
[FIG. 5] 5A-5B Each Figures is an explanatory Figures of the method of preparing of the ear mold in Examples of the present invention.
Figure 5B:
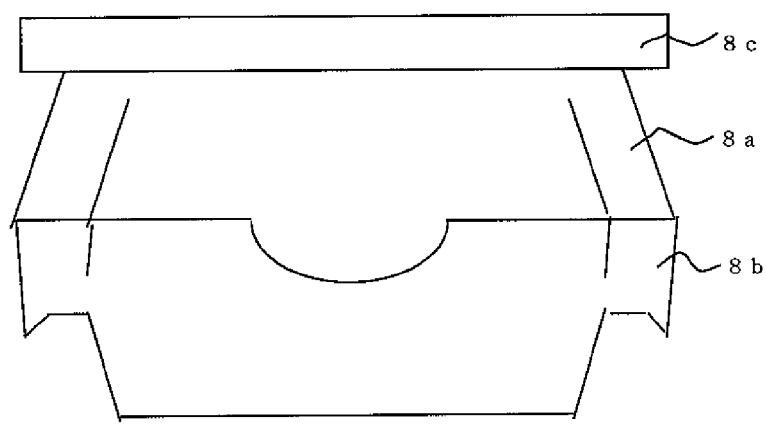
Figure 6A:
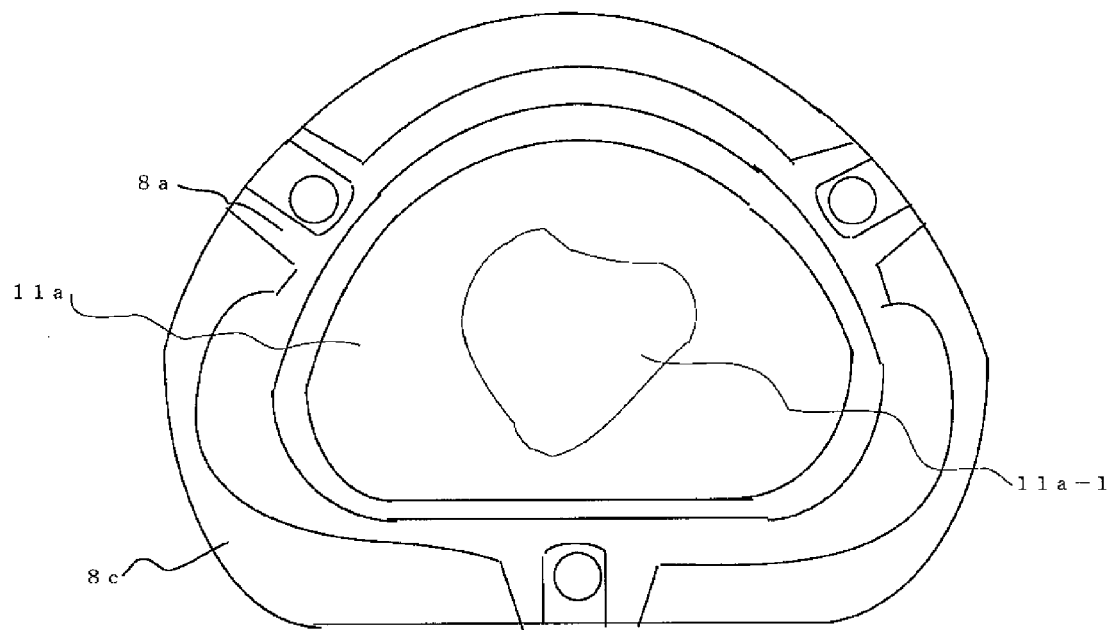
[FIG. 6] 6A-6B Each Figures is an explanatory Figures of the method of preparing of the ear mold in Examples of the present invention.
Figure 6B:
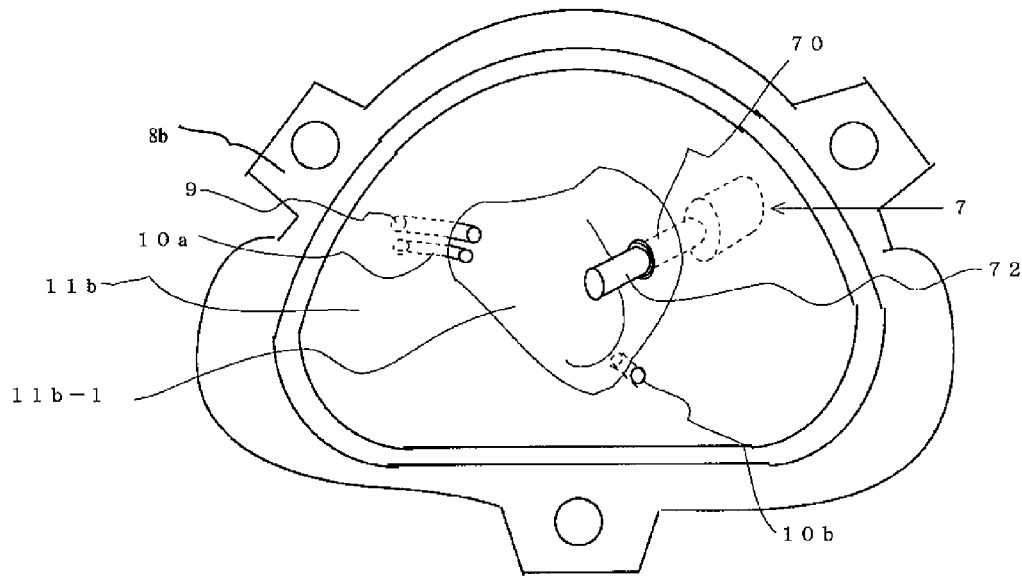
Figure 7A:
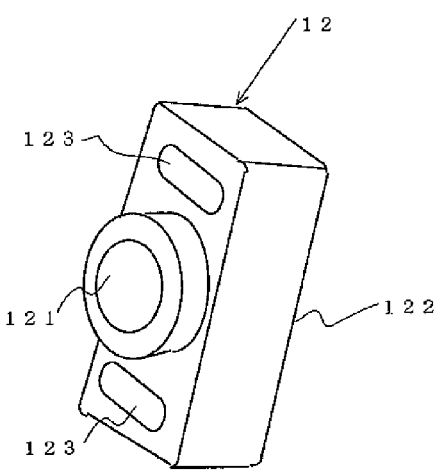
[FIG. 7] 7A-7D Each Figures is a schematic view of the hub embodying the present invention.
Figure 7B:
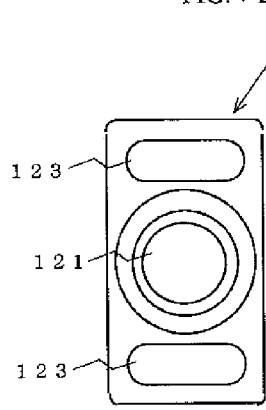
Figure 7C:
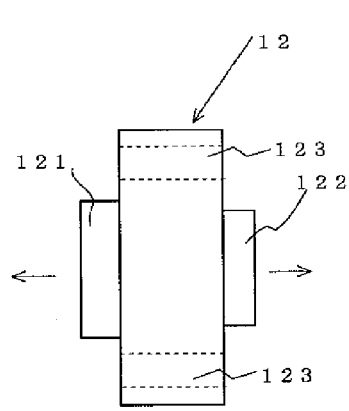
Figure 7D:
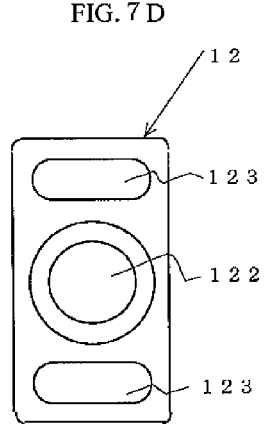
Figure 8A:
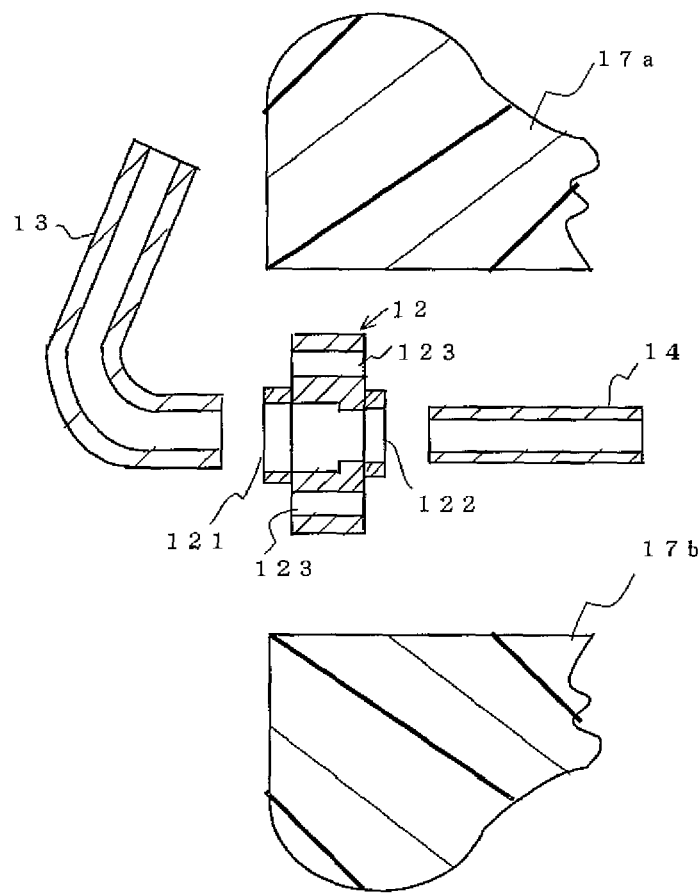
[FIG. 8] 8A It is partial sectional view of the ear mold embodying the present invention, 8B It is partial sectional view of the ear mold embodying the present invention
Figure 8B:
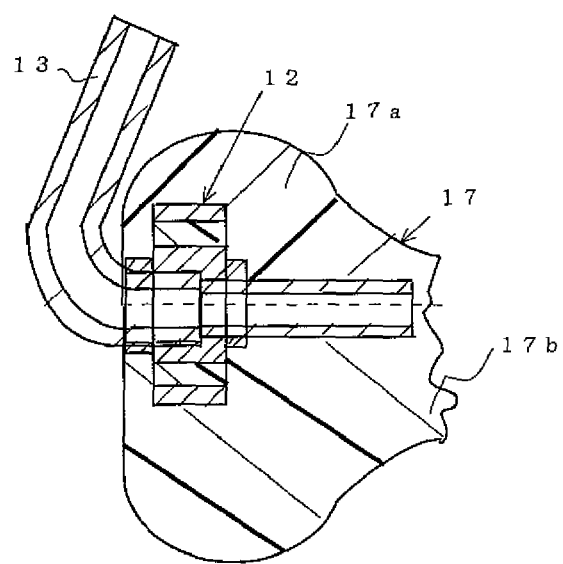
Figure 9:
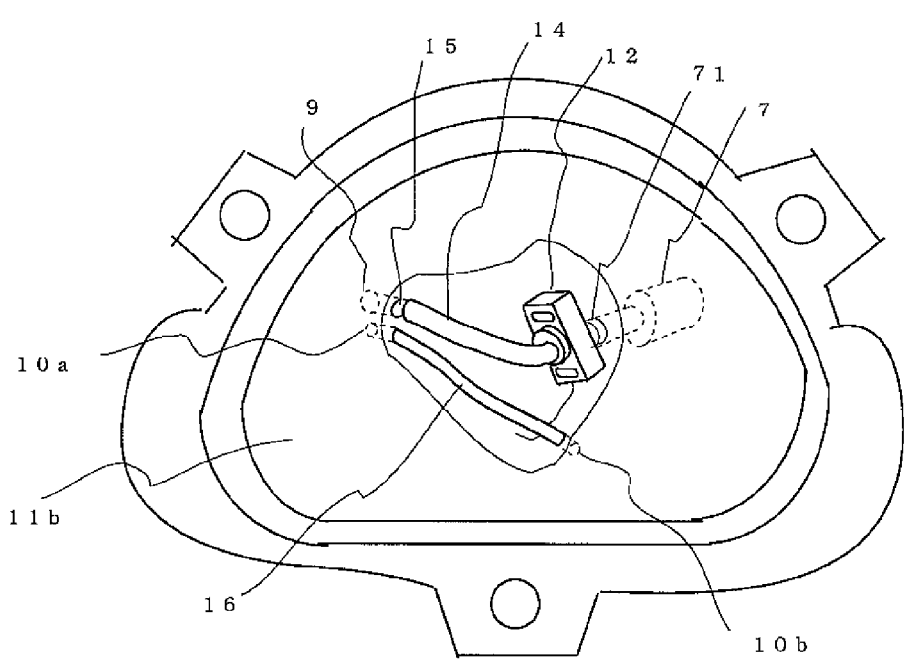
[FIG. 9] It is an explanatory Figures of the method of preparing of the ear mold in Examples of the present invention.
Figure 10A:
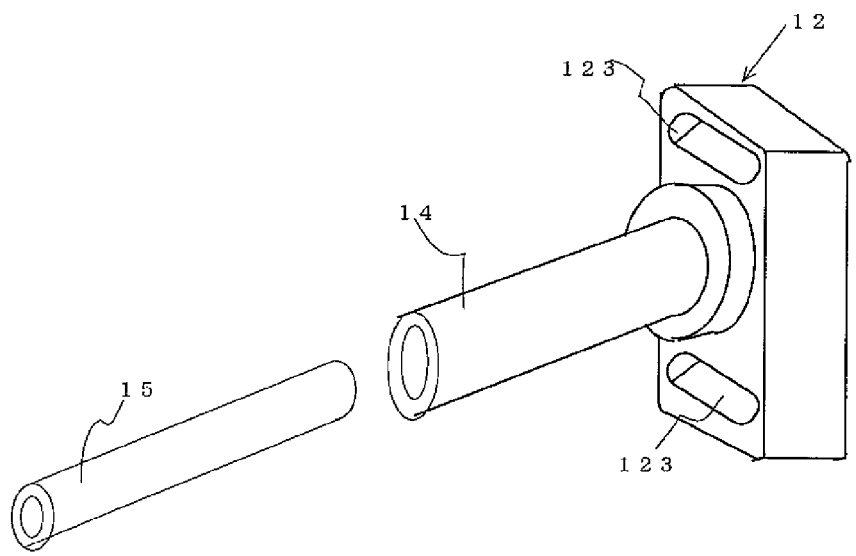
[FIG. 10] 10A-10B Each Figures is an explanatory Figures of the method of the ear mold in Examples of the present invention.
Figure 10B:
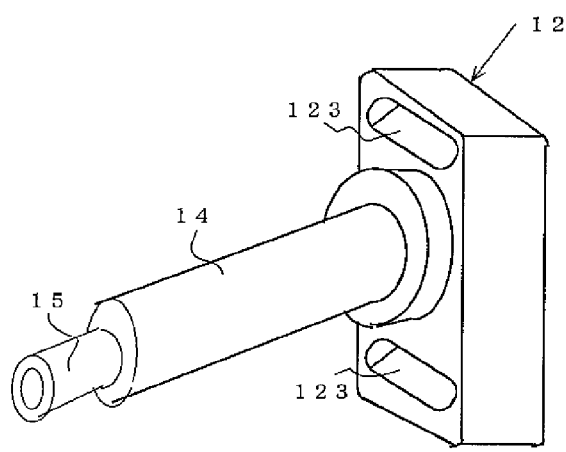
Figure 11A:
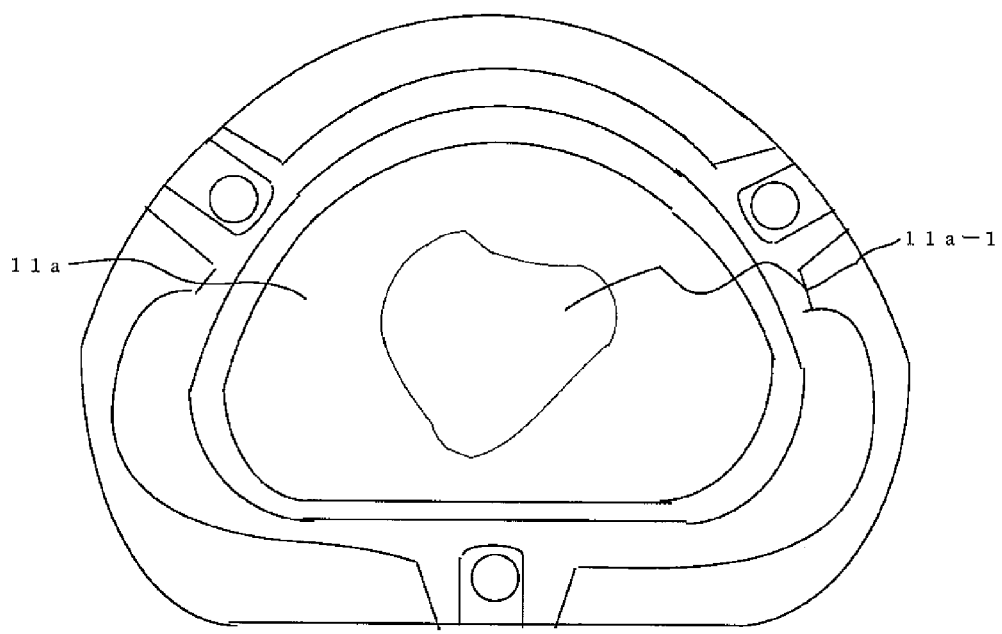
[FIG. 11] 11A-11B Each Figures is an explanatory Figures of the method of the ear mold in Examples of the present invention.
Figure 11B:
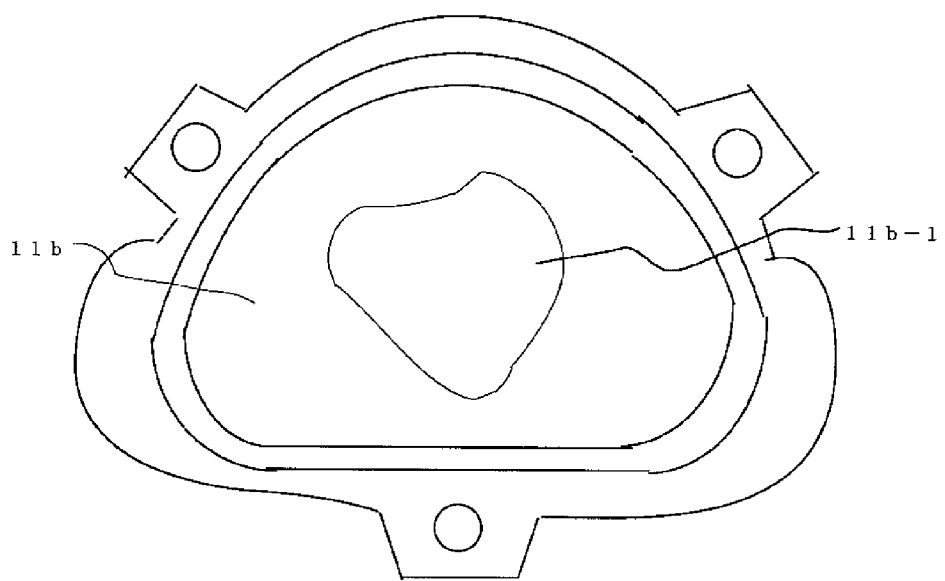
Figure 12A:
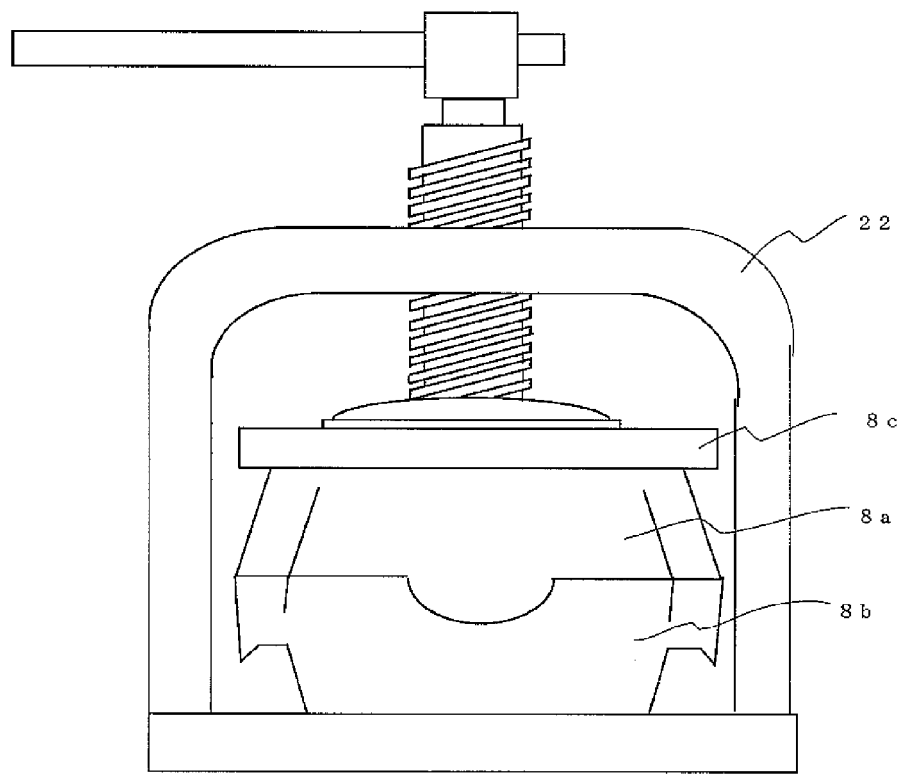
[FIG. 12] 12A-12B Each Figures is an explanatory Figures of the method of the ear mold in Examples of the present invention.
Figure 12B:
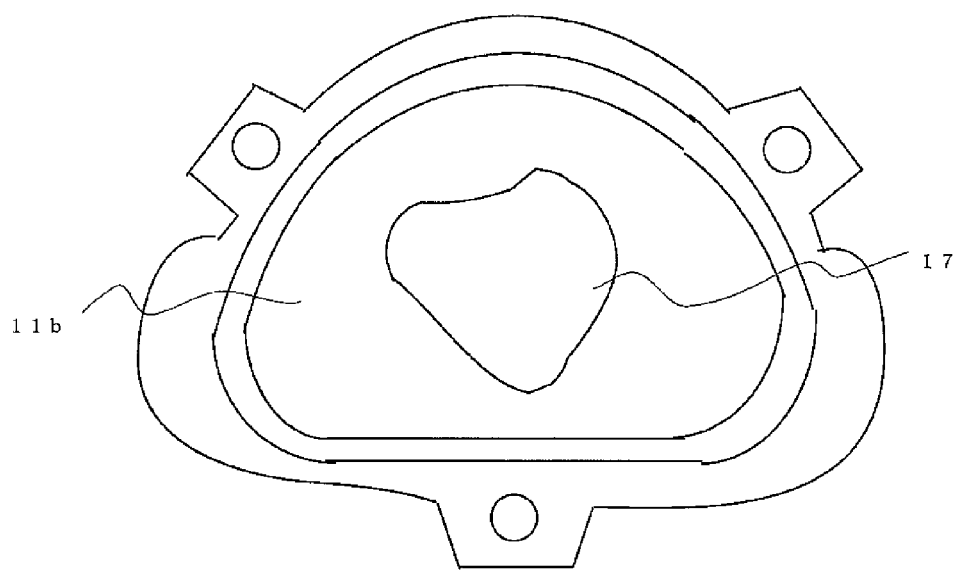
Figure 13A:
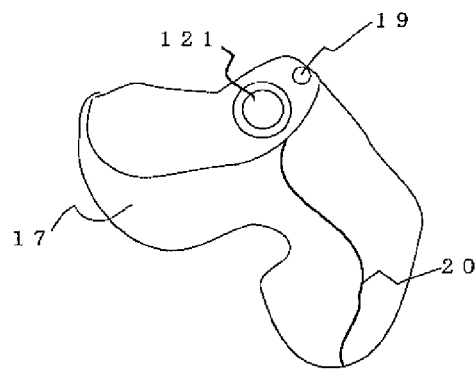
[FIG. 13] 13A It is an explanatory Figures of the method of preparing of the ear mold in Examples of the present invention, 13B It is a schematic view of the ear mold embodying the present invention. 13C It is an explanatory Figures of the method of preparing of the ear mold in Examples of the present invention, 13D It is an example of schematic view of the ear mold embodying the present invention.
Figure 13B:
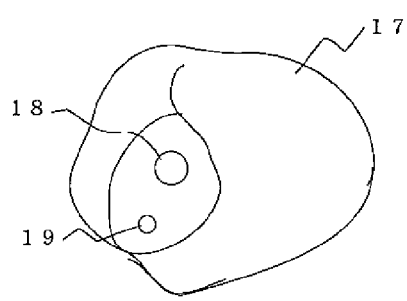
Figure 13C:
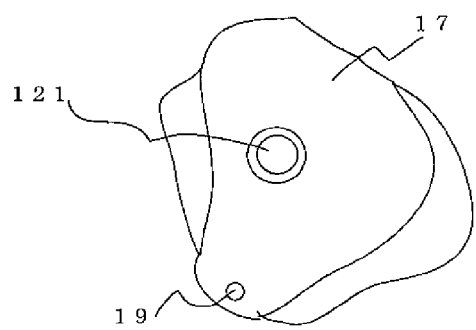
Figure 13D:
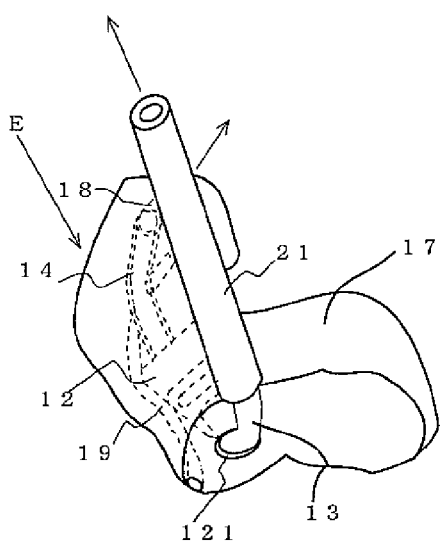
Figure 14:
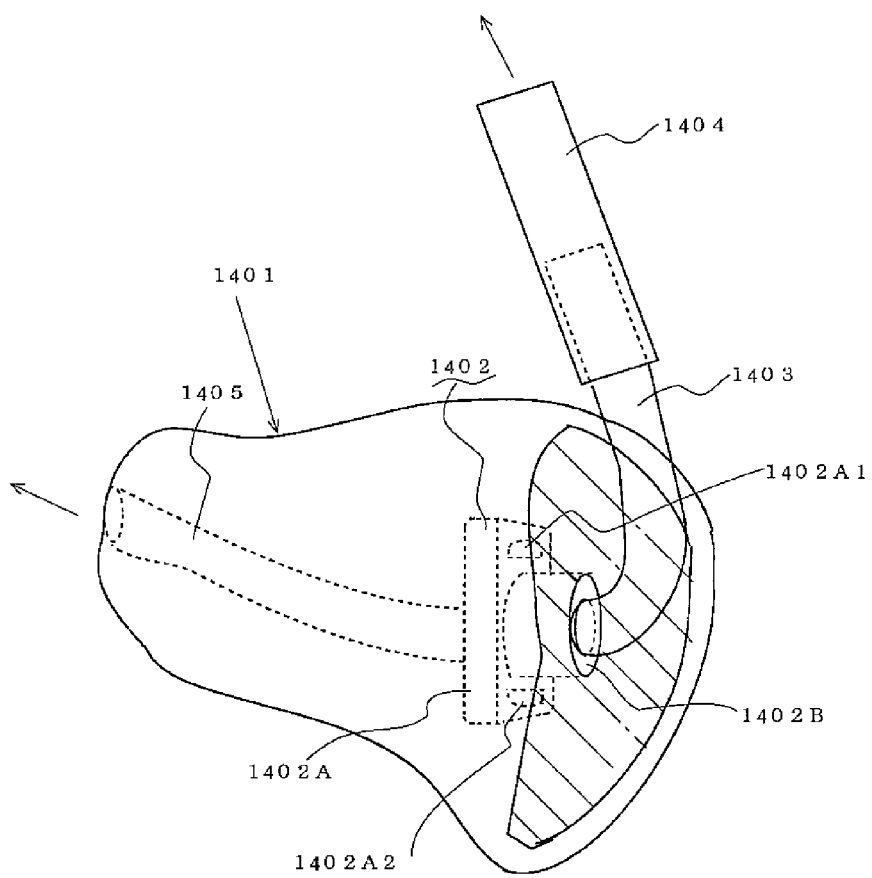
[FIG. 14] It is schematic view showing examples of conventional ear mold.
Figure 15:
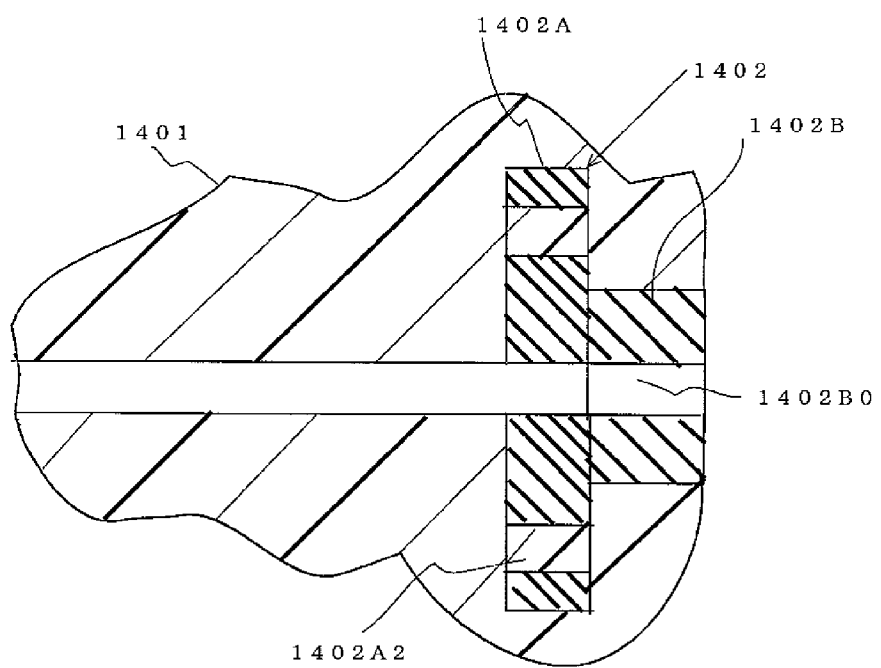
[FIG. 15] It is schematic view showing examples of conventional ear mold.
Figure 1:
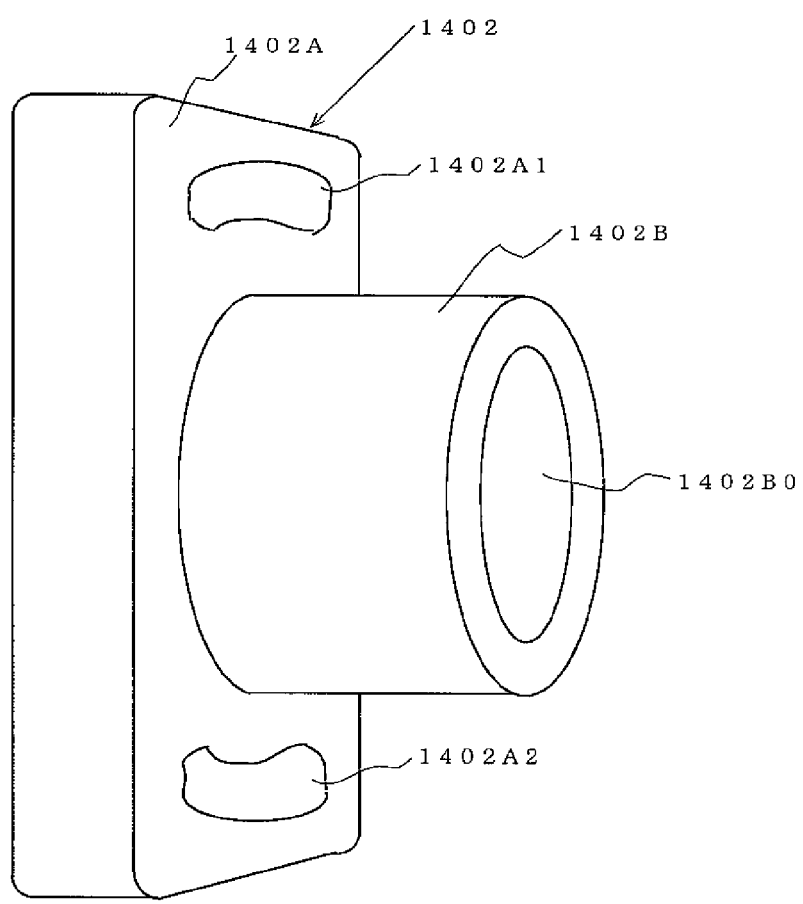
Figure 17:
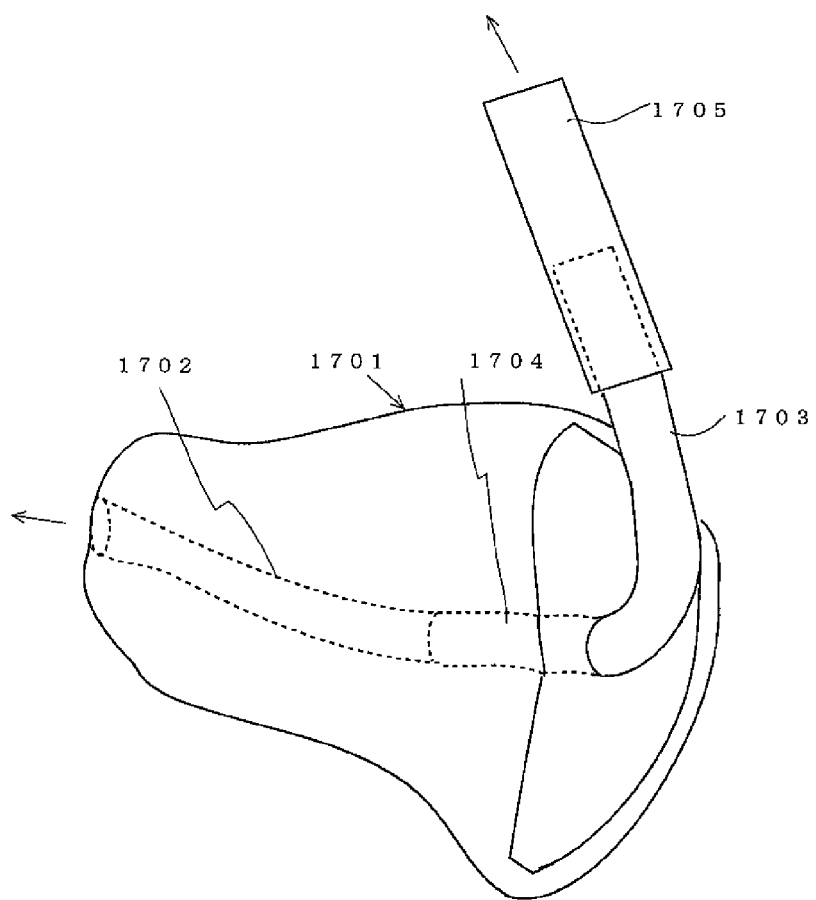
[FIG. 17] It is schematic view showing examples of conventional ear mold.
Figure 18:
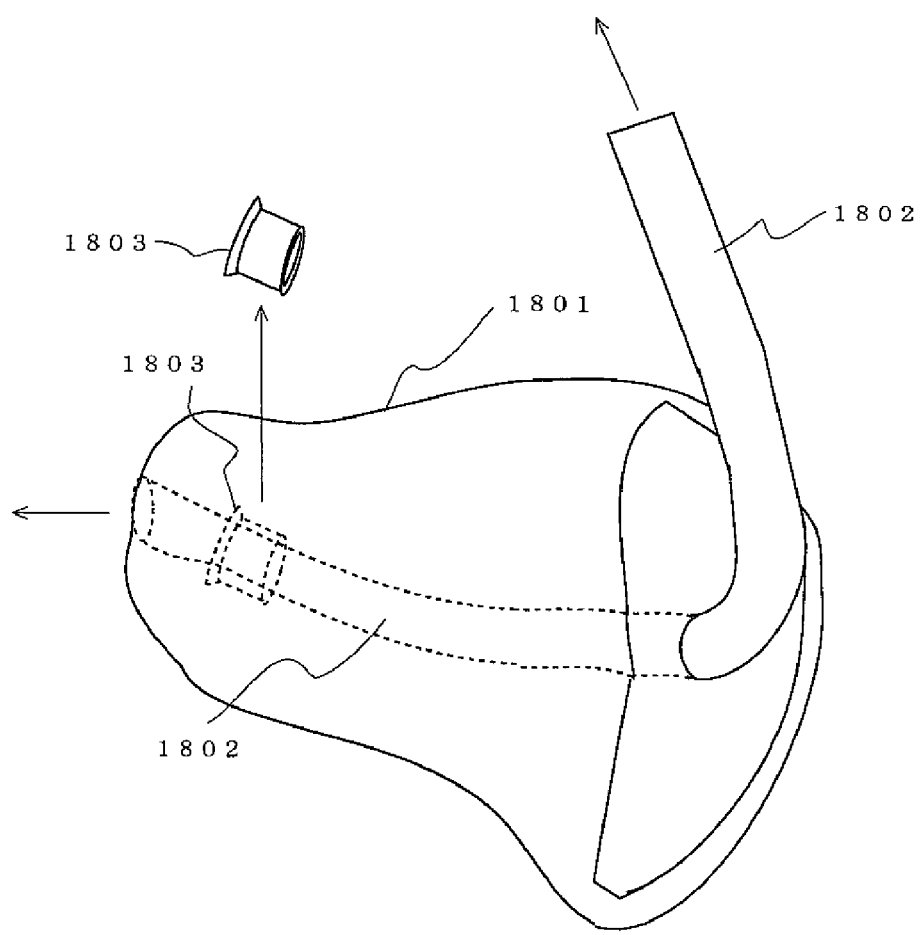
[FIG. 18] It is schematic view showing examples of conventional ear mold.

7 The tool for embedding of the hub
12 The hub
13 The elbow
14 The sound-leading tube
17 The body portion of the mold
19 The vent
121 The elbow-loading-hole
122 The sound-leading-tube-hole
123 The introductory-hole of the ear mold forming material
E The ear mold

What is claims is:

1. An ear mold based on custom-made impression and joined an ear hook hearing aid through an elbow and a tone tube comprising: a hub having a sound-leading-tube-loading-hole, an elbow-loading-hole and an introductory hole of a mold material embedded in the ear mold, a sound-leading tube was loaded in the sound-leading-tube-loading-hole of said hub, the elbow was loaded in the elbow-loading-hole of said hub, said tone tube was loaded in said elbow, said hub was fixed with the mold material of the ear mold through said introductory hole of the mold material.

2. An ear mold according to claim 1, in which said ear mold has a vent.

* * * * *